US012679708B2

(12) United States Patent
Muller et al.

(10) Patent No.: US 12,679,708 B2
(45) **Date of Patent: \*Jul. 14, 2026**

(54) MATERIALS HANDLING AND OTHER VEHICLES WITH FUNCTIONAL RESPONSES TO RUNTIME CALCULATION

(71) Applicant: Crown Equipment Corporation, New Bremen, OH (US)

(72) Inventors: Roland Muller, Feldkirchen (DE); Mingzhi Ma, Jiangsu (CN); Bin Feng Sha, Jiang Su (CN)

(73) Assignee: CROWN EQUIPMENT CORPORATION, New Bremen, OH (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/767,509

(22) Filed: Jul. 9, 2024

(65) Prior Publication Data

US 2025/0059014 A1 Feb. 20, 2025

Related U.S. Application Data

(63) Continuation of application No. 18/457,564, filed on Aug. 29, 2023, now Pat. No. 12,049,398, which is a
(Continued)

(51) Int. Cl.
*B66F 9/24* (2006.01)
*B60L 1/00* (2006.01)
(Continued)

(52) U.S. Cl.
CPC ..................................... *B66F 9/24* (2013.01); *B60L 1/00* (2013.01); *B60L 15/20* (2013.01); *B60L 2240/54* (2013.01); *G07C 5/004* (2013.01)

(58) Field of Classification Search
CPC ........ B66F 9/24; B66F 6011/00; B66F 15/20; B66F 2240/54; G07C 5/004; B60L 1/00; B60L 15/20; B60L 2240/54
(Continued)

(56) References Cited

U.S. PATENT DOCUMENTS 5,808,445 A * 9/1998 Aylor .................... H01M 10/48
320/132
8,060,400 B2 11/2011 Wellman
(Continued)

FOREIGN PATENT DOCUMENTS

CN 103823189 A 5/2014
CN 108875158 A 11/2018
(Continued)

OTHER PUBLICATIONS

International Search Report and Written Opinion issued on Jan. 8, 2024 in International Application No. PCT/CN2023/113370 filed Aug. 16, 2023, pp. 1-13.
(Continued)

*Primary Examiner* — Luis A Martinez Borrero
(74) *Attorney, Agent, or Firm* — Dinsmore & Shohl, LLP

(57) ABSTRACT

Battery management systems, removable battery assemblies with integrated battery management systems, and vehicles are provided for implementing the various runtime calculations disclosed herein. A vehicle, which may be a materials handling vehicle, is provided comprising a drive subsystem, a removable battery assembly, and vehicle control hardware. The battery assembly comprises a battery management system programmed to input or generate a state of charge signal representing a state of charge SOC of the battery assembly, implement a first EWMA signal filter $F_1$ to calculate a succession of contemporary current calculations $I_C$, implement a second EWMA signal filter $F_2$ to calculate a
(Continued)

runtime current $I_R$, wherein the runtime current calculation $I_R$ comprises the contemporary current calculations $I_C$ from the first EWMA signal filter $F_1$, and implement a remaining runtime calculation such that the vehicle control hardware responds functionally to the runtime calculation.

13 Claims, 7 Drawing Sheets

Related U.S. Application Data continuation of application No. PCT/CN2023/113370, filed on Aug. 16, 2023.

(51) Int. Cl.
 *B60L 15/20* (2006.01)
 *G07C 5/00* (2006.01)

(58) Field of Classification Search
 USPC .......................................................... 701/22
 See application file for complete search history.

(56) References Cited

U.S. PATENT DOCUMENTS

| | | | |
|---|---|---|---|
| 9,141,166 | B2 | 9/2015 | Sistla et al. |
| 9,376,971 | B2 | 6/2016 | Kumar et al. |
| 9,543,783 | B2 * | 1/2017 | Soong ....................... H02J 7/04 |
| 9,815,470 | B2 | 11/2017 | Kumar et al. |
| 10,312,699 | B2 * | 6/2019 | Subbaraman ....... H01M 10/488 |
| 10,525,965 | B2 * | 1/2020 | Kaun ................... B60W 40/12 |
| 11,447,015 | B1 * | 9/2022 | Wiegman ............. B64D 27/357 |
| 12,049,398 | B1 * | 7/2024 | Muller ................... B60L 15/20 |
| 2003/0184307 | A1 * | 10/2003 | Kozlowski ........... H01M 10/48 |
| | | | 324/427 |
| 2004/0090195 | A1 * | 5/2004 | Motsenbocker ........ B60L 58/25 |
| | | | 318/109 |
| 2007/0184339 | A1 * | 8/2007 | Scheucher ............. B60L 15/20 |
| | | | 211/13.1 |
| 2007/0188137 | A1 * | 8/2007 | Scheucher ............... H02J 1/10 |
| | | | 320/116 |
| 2008/0154712 | A1 * | 6/2008 | Wellman ............. G05D 1/0291 |
| | | | 235/375 |
| 2012/0091971 | A1 * | 4/2012 | Syed ....................... B60L 58/10 |
| | | | 180/65.29 |
| 2012/0185706 | A1 * | 7/2012 | Sistla .................... G06F 1/3206 |
| | | | 713/300 |
| 2012/0296512 | A1 * | 11/2012 | Lee ....................... H01M 10/48 |
| | | | 701/29.3 |
| 2014/0271114 | A1 * | 9/2014 | Phillips ................ G05B 19/048 |
| | | | 415/118 |
| 2015/0232097 | A1 * | 8/2015 | Luther ............... G01C 21/3415 |
| | | | 701/1 |
| 2015/0241517 | A1 * | 8/2015 | Zhuang ................ G01R 31/382 |
| | | | 702/63 |
| 2015/0367743 | A1 * | 12/2015 | Lin ........................... B60L 3/12 |
| | | | 320/109 |
| 2016/0368495 | A1 | 12/2016 | Kumar et al. |
| 2018/0045787 | A1 * | 2/2018 | Hellgren ............... B60L 3/0046 |
| 2018/0050608 | A1 * | 2/2018 | Hu .......................... B60L 15/10 |
| 2018/0276909 | A1 * | 9/2018 | Harshbarger .......... G07C 5/008 |
| 2021/0057694 | A1 * | 2/2021 | Zeiler ................. H01M 10/655 |
| 2021/0300206 | A1 * | 9/2021 | Martinsson ............. B60L 58/13 |
| 2021/0375080 | A1 * | 12/2021 | Kumar ................... G06Q 10/08 |
| 2021/0384746 | A1 * | 12/2021 | Zeiler ...................... B25F 5/02 |
| 2022/0032967 | A1 * | 2/2022 | Golov ...................... B60L 1/00 |
| 2022/0105793 | A1 * | 4/2022 | Sukhatankar ......... B60W 30/19 |
| 2022/0266717 | A1 * | 8/2022 | Kadam ................... B60L 53/20 |
| 2022/0266718 | A1 * | 8/2022 | Kadam ................... B60L 50/64 |
| 2022/0348113 | A1 * | 11/2022 | Delrieu ................... B60L 1/003 |
| 2023/0094310 | A1 * | 3/2023 | Zhao ....................... B60L 58/14 |
| | | | 701/22 |
| 2023/0129896 | A1 * | 4/2023 | Müller ................... B60L 50/66 |
| | | | 180/68.5 |
| 2023/0129917 | A1 * | 4/2023 | Müller ................ B66F 9/07531 |
| | | | 180/68.5 |
| 2023/0131139 | A1 * | 4/2023 | Müller .................... B60K 1/04 |
| | | | 180/68.5 |
| 2023/0131857 | A1 * | 4/2023 | Kuffner ................ B62B 3/0618 |
| | | | 280/43.12 |
| 2023/0236258 | A1 * | 7/2023 | Worry .................. G01R 31/392 |
| | | | 324/431 |
| 2023/0303091 | A1 * | 9/2023 | You .......................... B60L 53/65 |
| 2025/0059014 | A1 * | 2/2025 | Muller ................... B60L 15/20 |

FOREIGN PATENT DOCUMENTS

| | | |
|---|---|---|
| CN | 110133506 A | 8/2019 |
| CN | 116203437 A | 6/2023 |
| DE | 102009013649 A1 | 9/2010 |
| EP | 2944505 A2 | 11/2015 |
| KR | 1020030013701 A | 2/2003 |
| WO | 2004062010 A1 | 7/2004 |
| WO | 2020188285 A1 | 9/2020 |
| WO | 2023064377 A1 | 4/2023 |

OTHER PUBLICATIONS

Min Chen, et al.; "An Accurate Electrical Battery Model Capable of Predicting Runtime and I-V Performance"; IEEE transactions on energy conversion, 2006; 8 pages.
Martin Murane, et al.; "A Closer Look at State of Charge (SOC) and State of Health (SOH) Estimation Techniques for Batteries"; Analog Devices, Inc. 2017; 8 pages.
Shuaishuai Zhang, et al.; "State of Charge (SOC) Estimation Based on Extended Exponential Weighted Moving Average H∞ Filtering"; MDPI, Energies 2021; 15 pages.

* cited by examiner

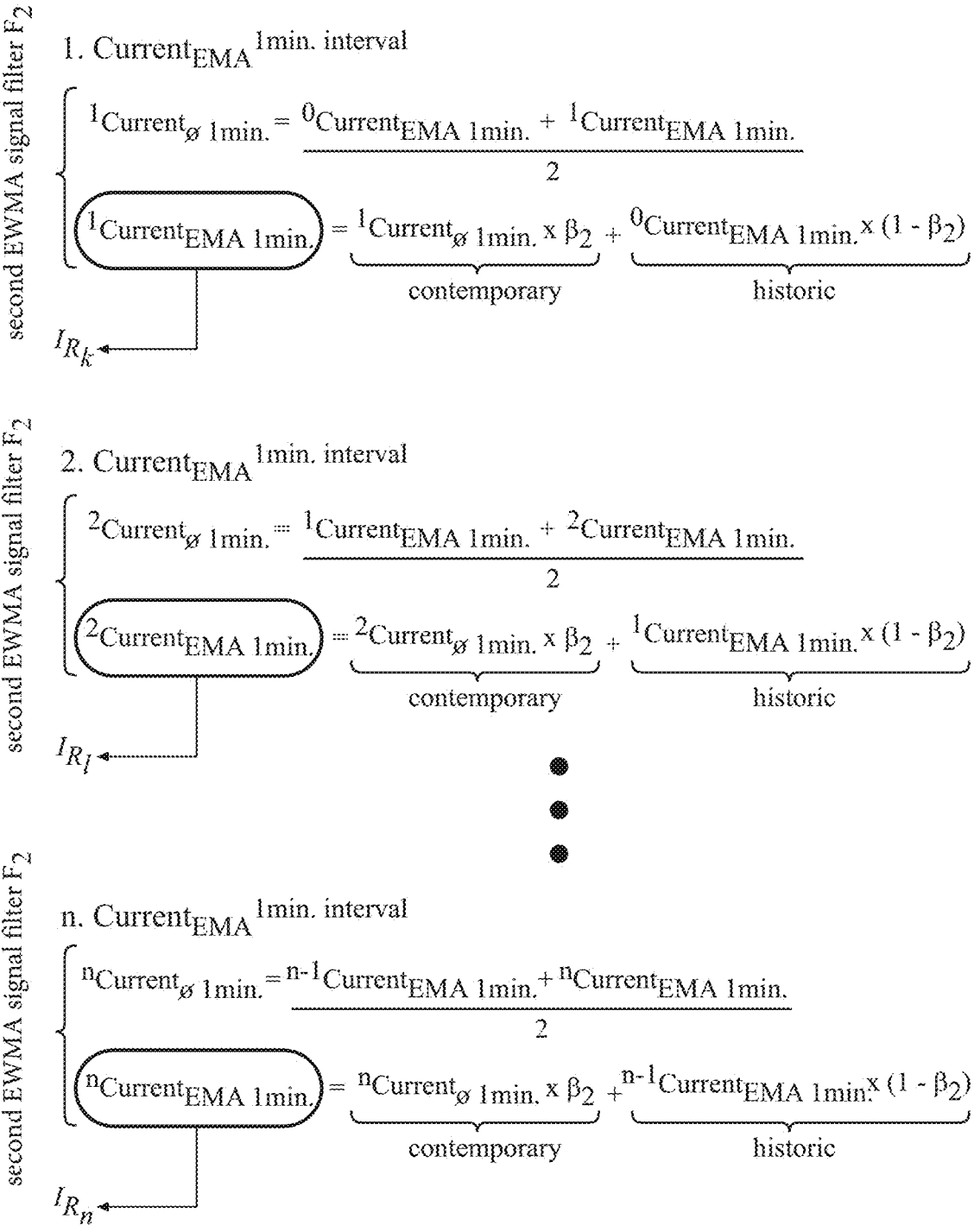

$1. \text{Current}_{EMA} \, ^{1\text{min. interval}}$ $^{1}\text{Current}_{\varnothing \, 1\text{min.}} = \dfrac{^{0}\text{Current}_{EMA \, 1\text{min.}} + \, ^{1}\text{Current}_{EMA \, 1\text{min.}}}{2}$ $\boxed{^{1}\text{Current}_{EMA \, 1\text{min.}}} = \underbrace{^{1}\text{Current}_{\varnothing \, 1\text{min.}} \times \beta_2}_{\text{contemporary}} + \underbrace{^{0}\text{Current}_{EMA \, 1\text{min.}} \times (1 - \beta_2)}_{\text{historic}}$ $I_{R_k}$ second EWMA signal filter $F_2$ $2. \text{Current}_{EMA} \, ^{1\text{min. interval}}$ $^{2}\text{Current}_{\varnothing \, 1\text{min.}} = \dfrac{^{1}\text{Current}_{EMA \, 1\text{min.}} + \, ^{2}\text{Current}_{EMA \, 1\text{min.}}}{2}$ $\boxed{^{2}\text{Current}_{EMA \, 1\text{min.}}} = \underbrace{^{2}\text{Current}_{\varnothing \, 1\text{min.}} \times \beta_2}_{\text{contemporary}} + \underbrace{^{1}\text{Current}_{EMA \, 1\text{min.}} \times (1 - \beta_2)}_{\text{historic}}$ $I_{R_l}$ second EWMA signal filter $F_2$ $\bullet$
$\bullet$
$\bullet$ $n. \text{Current}_{EMA} \, ^{1\text{min. interval}}$ $^{n}\text{Current}_{\varnothing \, 1\text{min.}} = \dfrac{^{n-1}\text{Current}_{EMA \, 1\text{min.}} + \, ^{n}\text{Current}_{EMA \, 1\text{min.}}}{2}$ $\boxed{^{n}\text{Current}_{EMA \, 1\text{min.}}} = \underbrace{^{n}\text{Current}_{\varnothing \, 1\text{min.}} \times \beta_2}_{\text{contemporary}} + \underbrace{^{n-1}\text{Current}_{EMA \, 1\text{min.}} \times (1 - \beta_2)}_{\text{historic}}$ $I_{R_n}$ second EWMA signal filter $F_2$

FIG. 7

MATERIALS HANDLING AND OTHER VEHICLES WITH FUNCTIONAL RESPONSES TO RUNTIME CALCULATION

CROSS-REFERENCE TO RELATED APPLICATIONS

This application is continuation application of U.S. patent application Ser. No. 18/457,564 filed Aug. 29, 2023 which is a bypass continuation application of International Patent Application No. PCT/CN2023/113370 filed Aug. 16, 2023, the entire disclosures of which are hereby incorporated herein by reference.

BACKGROUND

The present disclosure relates to materials handling and other vehicles and, more particularly, to battery-driven, or otherwise battery powered, materials handling vehicles such as, for example, a pallet truck, a forklift truck, a reach truck, a turret truck, a stacker truck, a walkie stacker truck, a tow tractor, a trailer loader, a side loader, a fork hoist, or any other type of materials handling vehicle that derives at least some operating power from a rechargeable battery. The present disclosure also relates to vehicles more generally.

BRIEF SUMMARY

Although a measurement of the state-of-charge (SOC) of a battery can provide useful information regarding the condition of a rechargeable battery powering a materials handling vehicle, the present inventors have recognized specific limitations associated with over-reliance on the SOC of a battery in operating materials handling vehicles. For example, the state-of-health (SOH) of a battery typically declines over repeated charge/discharge cycles. This creates a discrepancy in the actual energy content, i.e., the capacity, of the "cycled" battery, as compared to the "fresh" battery, even when both batteries are both at 100% SOC.

In many cases, battery-powered materials handling vehicles can be configured to receive batteries of different charge capacities. For example, a given vehicle operating under power from a low capacity battery at 75% SOC will not be able to operate as long as if the battery where a high capacity battery operating at 75% SOC. In addition, materials handling vehicle fleets often include a variety of vehicles with differing electrical power requirements. If these vehicles share a common source of rechargeable batteries, i.e., if the batteries can be swapped between different vehicles with different power requirements, then an indication of the SOC of a particular battery becomes even less useful to the operator of the vehicle. Accordingly, the present inventors have recognized that a SOC indication alone is not sufficient, in many cases, to convey the useful residual charge of a battery to the operator of a battery-powered materials handling vehicle.

According to the subject matter of the present disclosure, battery-powered materials handling vehicles are programmed to implement a forward-looking remaining runtime calculation R of the onboard battery, and respond functionally to the runtime calculation R to create a technical operational effect in the materials handling vehicle. The runtime calculations contemplated herein are based on learning algorithms that generate runtime calculations that are not characterized by abrupt drop-offs as the SOC of the battery declines, i.e., the runtime calculations proposed herein are more predictable and linear than conventional SOC and runtime calculations. In addition, the runtime calculations contemplated herein are more accurate than conventional battery assessment schemes because they are based on algorithms that account for unique characteristics of individual batteries and are based, for example, on the current and voltage characteristics that it sees for each battery.

Methods of calculating remaining battery runtime and responding functionally to the runtime calculation R are also contemplated, and are broadly applicable to materials handling vehicles utilizing batteries that are fully charged or partially discharged.

More particularly, the remaining runtime calculation R that is used to generate the functional responses and technical effects described herein comprises historic and contemporary components and, as a result, the runtime calculation R progressively becomes more and more accurate over time, as it adapts to the particular duty cycles of the vehicles in which the rechargeable battery is used. Notably, the battery management system of the present disclosure is programmed to implement a remaining runtime calculation by implementing a first EWMA signal filter as a pre-filter to a second EWMA signal filter. The acronym EWMA refers to an Exponentially Weighted Moving Average, which is a quantitative or statistical measure used to model or describe a time series for technical analysis. The acronym EMA, which is often used interchangeably with EWMA, refers more generically to an Exponential Moving Average, which may or may not comprise a weighting coefficient.

Although the concepts of the present disclosure are described herein with primary reference to battery-powered pallet trucks with removable battery assemblies, it is contemplated that the concepts will enjoy applicability to any materials handling vehicle that is at least partially powered by a rechargeable battery, regardless of whether the battery is removable. Contemplated vehicles may also include supplemental or alternative power sources including any conventional or yet-to-be developed power source suitable for use with materials handling vehicles. Materials handling vehicles contemplated by the present disclosure may be configured for operation within, or outside of, a warehouse environment. In the context of the present disclosure, it is noted that a "warehouse environment" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes. Outside of the warehouse environment, materials handling vehicles contemplated in the present disclosure include any vehicle that is primarily configured for handling goods such as, for example, a materials handling vehicle that is designed to operate in the storage space of an over-the-road vehicle.

In accordance with one embodiment of the present disclosure, a materials handling vehicle is provided comprising a materials handling subsystem, a drive subsystem, a removable battery assembly, and vehicle control hardware. The vehicle control hardware is either dedicated to the materials handling subsystem, the drive subsystem, or the removable battery assembly, or shared by a combination thereof. The materials handling subsystem, the drive subsystem, and the vehicle control hardware are configured to cooperate, under power from the removable battery assembly, to execute a plurality of pick/place operations, where the pick/place operations are characterized by a minimum duration $t_{P/P(min)}$. The removable battery assembly comprises a battery management system that is programmed to input or generate a state of charge signal representing a state of charge SOC of the battery assembly, implement a first EWMA signal filter $F_1$ to calculate a succession ($^0I_C$, $^1I_C$, $^2I_C$, . . . ) of contemporary current calculations $I_C$ wherein the contemporary current calculations advance by a time interval $t_1$ and comprise $$I_C = [(A \times \beta_1)] + [B \times (1 - \beta_1)]$$

where A comprises an average current load on the battery over the time interval $t_1$, B comprises a predetermined current load or a historic EWMA current calculation that precedes the average current load of A, temporally, $\beta_1$ comprises a first weighting parameter, and $t_1 > t_{P/P(min)}$.

The battery management system is further programmed to implement a second EWMA signal filter $F_2$ to calculate a runtime current $I_R$, wherein the runtime current calculation comprises $$I_R = [(C \times \beta_2)] + [D \times (1 - \beta_2)]$$

where C comprises an average, over a time envelope $t_E$, of a plurality of the succession ($^0I_C$, $^1I_C$, $^2I_C$, . . . ) of contemporary current calculations $I_C$ from the first EWMA signal filter $F_1$, D comprises a historic EWMA current calculation that precedes temporally at least one of the plurality of the succession ($^0I_C$, $^1I_C$, $^2I_C$, . . . ) of contemporary current calculations $I_C$ from the first EWMA signal filter $F_1$, $\beta_2$ comprises a second weighting parameter.

The battery management system is further programmed to implement a remaining runtime calculation R comprising $$R = SOC/I_R$$

and the vehicle control hardware is programmed to respond functionally to the runtime calculation R.

In accordance with embodiments of intermediate scope, it is contemplated that materials handling vehicles of the present disclosure may comprise various combinations of the aforementioned materials handling subsystem, a drive subsystem, a removable battery assembly, and vehicle control hardware.

Further embodiments of the present disclosure may comprise battery management systems that are programmed to execute various combinations of the aforementioned implementation steps, and various combinations of the aforementioned aspects of each implementation step. For example, battery management systems of the present disclosure may be programmed to (i) input or generate a state of charge signal representing a state of charge SOC of the battery assembly, (ii) implement a first EWMA signal filter $F_1$ to calculate a succession ($^0I_C$, $^1I_C$, $^2I_C$, . . . ) of contemporary current calculations $I_C$, (iii) implement a second EWMA signal filter $F_2$ to calculate a runtime current $I_R$, wherein the runtime current calculation $I_R$ comprises the contemporary current calculations $I_C$ from the first EWMA signal filter $F_1$, and (iv) implement a remaining runtime calculation R comprising $$R = SOC/I_R$$

where the vehicle control hardware is programmed to respond functionally to the runtime calculation R.

More comprehensively, in accordance with another embodiment of the present disclosure, a vehicle is provided comprising a drive subsystem, a removable battery assembly, and vehicle control hardware. The vehicle control hardware is either dedicated to the drive subsystem, or the removable battery assembly, or shared by a combination thereof. The removable battery assembly comprises a battery management system that is programmed to (i) input or generate a state of charge signal representing a state of charge SOC of the battery assembly, (ii) implement a first EWMA signal filter $F_1$ to calculate a succession ($^0I_C$, $^1I_C$, $^2I_C$, . . . ) of contemporary current calculations $I_C$, (iii) implement a second EWMA signal filter $F_2$ to calculate a runtime current $I_R$, wherein the runtime current calculation $I_R$ comprises the contemporary current calculations $I_C$ from the first EWMA signal filter $F_1$, and (iv) implement a remaining runtime calculation R comprising $$R = SOC/I_R$$

where the vehicle control hardware is programmed to respond functionally to the runtime calculation R.

In accordance with a first aspect of the aforementioned embodiment, the vehicle comprises a materials handling subsystem and the vehicle control hardware is either dedicated to the materials handling subsystem, the drive subsystem, or the removable battery assembly, or shared by a combination thereof, and the materials handling subsystem, the drive subsystem, and the vehicle control hardware are configured to cooperate, under power from the removable battery assembly, to execute a plurality of pick/place operations.

In accordance with a second aspect of the aforementioned embodiment, which aspect may be combined selectively with any of the preceding or subsequently disclosed embodiments, aspects, features, and characteristics of the present disclosure, the first EWMA signal filter $F_1$ comprises a historic EWMA component and the second EWMA signal filter $F_2$ comprises a historic EWMA component.

In accordance with additional embodiments of the present disclosure, removable battery assemblies and integrated battery management systems are provided for implementing the various runtime calculations disclosed herein.

In accordance with alternative embodiments of the present disclosure, integrated battery management systems are provided for implementing the various runtime calculations disclosed herein.

Various aspects of the present disclosure will enjoy applicability to any of the preceding and subsequently disclosed embodiments, aspects, features, and characteristics of the present disclosure. Specifically, according to a first aspect of the present disclosure, which may be combined selectively with preceding or subsequently disclosed embodiments, aspects, features and characteristics of the present disclosure, the vehicle control hardware of the materials handling subsystem comprises user-interfacing lift/lower controls and supporting electronics and the user-interfacing lift/lower controls and supporting electronics are configured to automatically cut off, progressively limit, or otherwise disable, lift/lower functionality of the materials handling vehicle, as a function of the runtime calculation R, or when the runtime calculation R falls below a predetermined threshold.

According to a second aspect of the present disclosure, which may be combined selectively with preceding or subsequently disclosed embodiments, aspects, features and characteristics of the present disclosure, the vehicle control hardware of the materials handling subsystem comprises user-interfacing drive mode controls and supporting electronics and the user-interfacing drive mode controls and supporting electronics are configured to automatically cut off, progressively limit, or otherwise disable, specific drive modes of the materials handling vehicle, as a function of the runtime calculation R, or when the runtime calculation R falls below a predetermined threshold.

According to a third aspect of the present disclosure, which may be combined selectively with preceding or subsequently disclosed embodiments, aspects, features and characteristics of the present disclosure, the vehicle control hardware of the materials handling subsystem comprises battery hardware and supporting electronics and the battery hardware and supporting electronics comprise battery insertion/removal hardware, diagnostic controls, or visual displays on the battery assembly, and are configured to automatically change, enable, or disable, as a function of the runtime calculation R, or when the runtime calculation R falls below a predetermined threshold. Optionally, the battery hardware and supporting electronics may comprise a visual runtime display on the battery, or elsewhere on the vehicle, that is configured to progressively change as a function of the runtime calculation R. According to one feature of the aforementioned aspect, which feature may be combined selectively with preceding or subsequently disclosed embodiments, aspects, features and characteristics of the present disclosure, the runtime display comprises non-numeric graphical representations of the remaining runtime using increments that represent equal amounts of time, to avoid instances where some increments in the graphical illustration disappear more quickly than others as remaining the runtime decreases.

According to a fourth aspect of the present disclosure, which may be combined selectively with preceding or subsequently disclosed embodiments, aspects, features and characteristics of the present disclosure, the battery management system is programmed to reduce the time envelope $t_E$ of the second EWMA signal filter $F_2$ as a function of the SOC of the battery assembly.

According to a first feature of the first aspect of the present disclosure, which may be combined selectively with preceding or subsequently disclosed embodiments, aspects, features and characteristics of the present disclosure, the battery management system is programmed to reduce the time envelope $t_E$ of the second EWMA signal filter $F_2$ when the SOC of the battery assembly falls below a first SOC threshold. The battery management system may be programmed to further reduce the time envelope $t_E$ of the second EWMA signal filter $F_2$ when the SOC of the battery assembly falls below a second SOC threshold that is lower than the first SOC threshold.

According to a second feature of the first aspect of the present disclosure, which may be combined selectively with preceding or subsequently disclosed embodiments, aspects, features and characteristics of the present disclosure, the time envelope $t_E$ of the second EWMA signal filter $F_2$ is a multiple of the time interval $t_1$ and regresses from a first multiple when the SOC of the battery assembly is above a first SOC threshold, to a lower second multiple when the SOC of the battery assembly falls below the first SOC threshold.

According to a first characteristic of the second feature of the first aspect of the present disclosure, which characteristic may be combined selectively with preceding or subsequently disclosed embodiments, aspects, features and characteristics of the present disclosure, the first SOC threshold may be between approximately 10% and approximately 30%.

According to a second characteristic of the second feature of the first aspect of the present disclosure, which characteristic may be combined selectively with preceding or subsequently disclosed embodiments, aspects, features and characteristics of the present disclosure, the time envelope $t_E$ of the second EWMA signal filter $F_2$ is approximately 3 minutes and the time interval $t_1$ is approximately 1 minute, when the SOC of the battery assembly is above the first SOC threshold, and the time envelope $t_E$ of the second EWMA signal filter $F_2$ is approximately 2 minutes when the SOC of the battery assembly falls below the first SOC threshold.

According to a third characteristic of the second feature of the first aspect of the present disclosure, which characteristic may be combined selectively with preceding or subsequently disclosed embodiments, aspects, features and characteristics of the present disclosure, the time envelope $t_E$ of the second EWMA signal filter $F_2$ further regresses from the second lower multiple to a third lower multiple when the SOC of the battery assembly falls below a second SOC threshold.

According to a first variation of the aforementioned third characteristic, which variation may be selectively combined with preceding or subsequently embodiments, aspects, features and characteristics of the present disclosure, the second SOC threshold may be between approximately 5% and approximately 20%. According to a second variation, which variation may be selectively combined with preceding or subsequently disclosed aspects, features, characteristics and variations of the present disclosure, the time envelope $t_E$ of the second EWMA signal filter $F_2$ is approximately 1 minute when the SOC of the battery assembly falls below the second SOC threshold.

According to fifth and sixth aspects of the present disclosure, which characteristic may be combined selectively with preceding or subsequently disclosed embodiments, aspects, features, and characteristics of the present disclosure, $\beta_2 < \beta_1$ or 1.5 $\beta_2 < \beta_1$.

According to a seventh aspect of the present disclosure, which may be combined selectively with preceding or subsequently disclosed embodiments, aspects, features, and characteristics of the present disclosure, the average current load A of the first EWMA signal filter $F_1$ is determined based on hundreds of current value readings over the time interval $t_1$, and the time interval $t_1$ is between approximately 1 min. and approximately 10 mins.

According to an eighth aspect of the present disclosure, which may be combined selectively with preceding or subsequently disclosed embodiments, aspects, features, and characteristics of the present disclosure, the battery management system is programmed to implement the first EWMA signal filter $F_1$ with B comprising a historic EWMA current calculation that is taken before the materials handling vehicle enters an atypical mode of operation.

According to a ninth aspect of the present disclosure, which may be combined selectively with preceding or subsequently disclosed embodiments, aspects, features, and characteristics of the present disclosure, the battery management system is programmed to implement the first EWMA signal filter $F_1$ with B comprising a predetermined current load when a historic EWMA current calculation is not available, and B>(0.5)$I_{MAX}$, where $I_{MAX}$ comprises a maximum current load on the battery assembly with the materials handling subsystem, the drive subsystem, and the vehicle control hardware configured to cooperate to execute the plurality of pick/place operations.

According to a tenth aspect of the present disclosure, which may be combined selectively with preceding or subsequently disclosed embodiments, aspects, features, and characteristics of the present disclosure, the battery management system is programmed to implement the first EWMA signal filter $F_1$ with B comprising a historic EWMA current calculation that is an average of the average current load A and one or more previously calculated EWMAs of battery assembly current load.

According to an eleventh aspect of the present disclosure, which may be combined selectively with preceding or subsequently disclosed embodiments, aspects, features, and characteristics of the present disclosure, the battery management system is programmed to calculate successive runtime currents $IR_1$, $IR_2$, $IR_3$, etc., by temporally advancing sampling periods associated with the average C and the historic EWMA current calculation D of the second EWMA signal filter $F_2$.

According to a twelfth aspect of the present disclosure, which may be combined selectively with preceding or subsequently disclosed embodiments, aspects, features, and characteristics of the present disclosure, the sampling periods associated with the average C and the historic EWMA current calculation D of the second EWMA signal filter $F_2$ are both advanced by the time interval $t_1$ to calculate the successive runtime currents $IR_1$, $IR_2$, $IR_3$, etc.

According to a thirteenth aspect of the present disclosure, which may be combined selectively with preceding or subsequently disclosed embodiments, aspects, features, and characteristics of the present disclosure, the battery management system is programmed to (i) implement the first EWMA signal filter $F_1$ with B comprising a historic EWMA current calculation that is an average of the average current load A and one or more previously calculated EWMAs of battery assembly current load, (ii) calculate successive runtime currents $IR_1$, $IR_2$, $IR_3$, etc., by temporally advancing sampling periods associated with the average C and the historic EWMA current calculation D of the second EWMA signal filter $F_2$, and (iii) the sampling periods associated with the average C and the historic EWMA current calculation D of the second EWMA signal filter $F_2$ are both advanced by the time interval $t_1$ to calculate the successive runtime currents $IR_1$, $IR_2$, $IR_3$, etc.

According to a fourteenth aspect of the present disclosure, which may be combined selectively with preceding or subsequently disclosed embodiments, aspects, features, and characteristics of the present disclosure, the materials handling subsystem, the drive subsystem, and the vehicle control hardware are configured to cooperate to execute the plurality of pick/place operations such that an actual current load I on the battery assembly cycles between a local maximum and a local minimum a plurality of times over the time interval t.

According to a first feature of the fourteenth aspect of the present disclosure, which may be combined selectively with preceding or subsequently disclosed embodiments, aspects, features, and characteristics of the present disclosure, the local maximum and the local minimum differ by at least approximately 1000 mA and the time interval $t_1$ is approximately 1 min.

According to a second feature of the fourteenth aspect of the present disclosure, which may be combined selectively with preceding or subsequently disclosed embodiments, aspects, features, and characteristics of the present disclosure, the local maximum and the local minimum differ by at least approximately 1000 mA and the time interval $t_1$ is ≤1 min.

According to a first characteristic of the aforementioned second feature of the fourteenth aspect of the present disclosure, which characteristic may be combined selectively with preceding or subsequently disclosed embodiments, aspects, features, and characteristics of the present disclosure, the local maximum and the local minimum are both greater than 0 mA.

According to a second characteristic of the aforementioned second feature of the fourteenth aspect of the present disclosure, which characteristic may be combined selectively with preceding or subsequently disclosed embodiments, aspects, features, and characteristics of the present disclosure, the local maximum is greater than zero Ampere and the local minimum is less than or equal to 0 mA.

According to a first variation of the aforementioned characteristic, which variation may be combined selectively with preceding or subsequently disclosed embodiments, aspects, features, and characteristics of the present disclosure, the local maximum and the local minimum differ by at least approximately 1000 mA and less than approximately 5000 mA.

According to a fifteenth aspect of the present disclosure, which may be combined selectively with preceding or subsequently disclosed embodiments, aspects, features, and characteristics of the present disclosure, (i) the materials handling subsystem, the drive subsystem, and the vehicle control hardware are configured to cooperate to execute the plurality of pick/place operations such that an actual current load/on the battery assembly cycles a plurality of times over the time interval $t_1$ between local maxima and local minima that differ by at least approximately 1000 mA and less than approximately 5000 mA, (ii) the battery management system is programmed to implement the first EWMA signal filter $F_1$ with B comprising a historic EWMA current calculation that is an average of the average current load A and one or more previously calculated EWMAs of battery assembly current load, (iii) the battery management system is programmed to calculate successive runtime currents $IR_1$, $IR_2$, $IR_3$, etc., by temporally advancing sampling periods associated with the average C and the historic EWMA current calculation D of the second EWMA signal filter $F_2$, (iv) the sampling periods associated with the average C and the historic EWMA current calculation D of the second EWMA signal filter $F_2$ are both advanced by the time interval $t_1$ to calculate the successive runtime currents $IR_1$, $IR_2$, $IR_3$, etc, and (v) 1.5 $\beta_2 < \beta_1$.

In accordance with still further embodiments of the present disclosure, methods of calculating remaining battery runtime of a removable materials handling vehicle battery assembly are provided, the methods utilizing the materials handling vehicles, removable battery assemblies, and/or battery management systems disclosed herein.

In accordance with one aspect of the various methods contemplated herein, which aspect may be combined selectively with preceding or subsequently disclosed embodiments, aspects, features and characteristics of the present disclosure, the vehicle control hardware of the materials handling subsystem comprises user-interfacing lift/lower controls and supporting electronics, and the method comprises using the lift/lower controls and supporting electronics to automatically cut off, progressively limit, or otherwise disable, lift/lower functionality of the materials handling vehicle, as a function of the runtime calculation R, or when the runtime calculation R falls below a predetermined threshold.

In accordance with an additional aspect of the various methods contemplated herein, which aspect may be combined selectively with preceding or subsequently disclosed embodiments, aspects, features and characteristics of the present disclosure, the vehicle control hardware of the materials handling subsystem comprises user-interfacing drive mode controls and supporting electronics, and the method further comprises using the drive mode controls and supporting electronics to automatically cut off, progressively limit, or otherwise disable, specific drive modes of the materials handling vehicle, as a function of the runtime calculation R, or when the runtime calculation R falls below a predetermined threshold.

In accordance with a still further aspect of the various methods contemplated herein, which aspect may be combined selectively with preceding or subsequently disclosed embodiments, aspects, features and characteristics of the present disclosure, the vehicle control hardware of the materials handling subsystem comprises battery hardware and supporting electronics, and the method further comprises automatically changing, enabling, or disabling the battery hardware and supporting electronics, as a function of the runtime calculation R, or when the runtime calculation R falls below a predetermined threshold.

In accordance with a feature of the aforementioned aspect of the present disclosure, which feature may be combined selectively with preceding or subsequently disclosed embodiments, aspects, features and characteristics of the present disclosure, the battery hardware and supporting electronics comprises a visual runtime display on the battery, or elsewhere on the vehicle, and the method further comprises progressively changing a runtime indication on the visual runtime display as a function of the runtime calculation R.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 5-7 illustrate examples of the implementation of a second EWMA signal filter $F_2$, with progressively shorter time envelopes $t_E$, according to the present disclosure.

DETAILED DESCRIPTION

Figure 1:
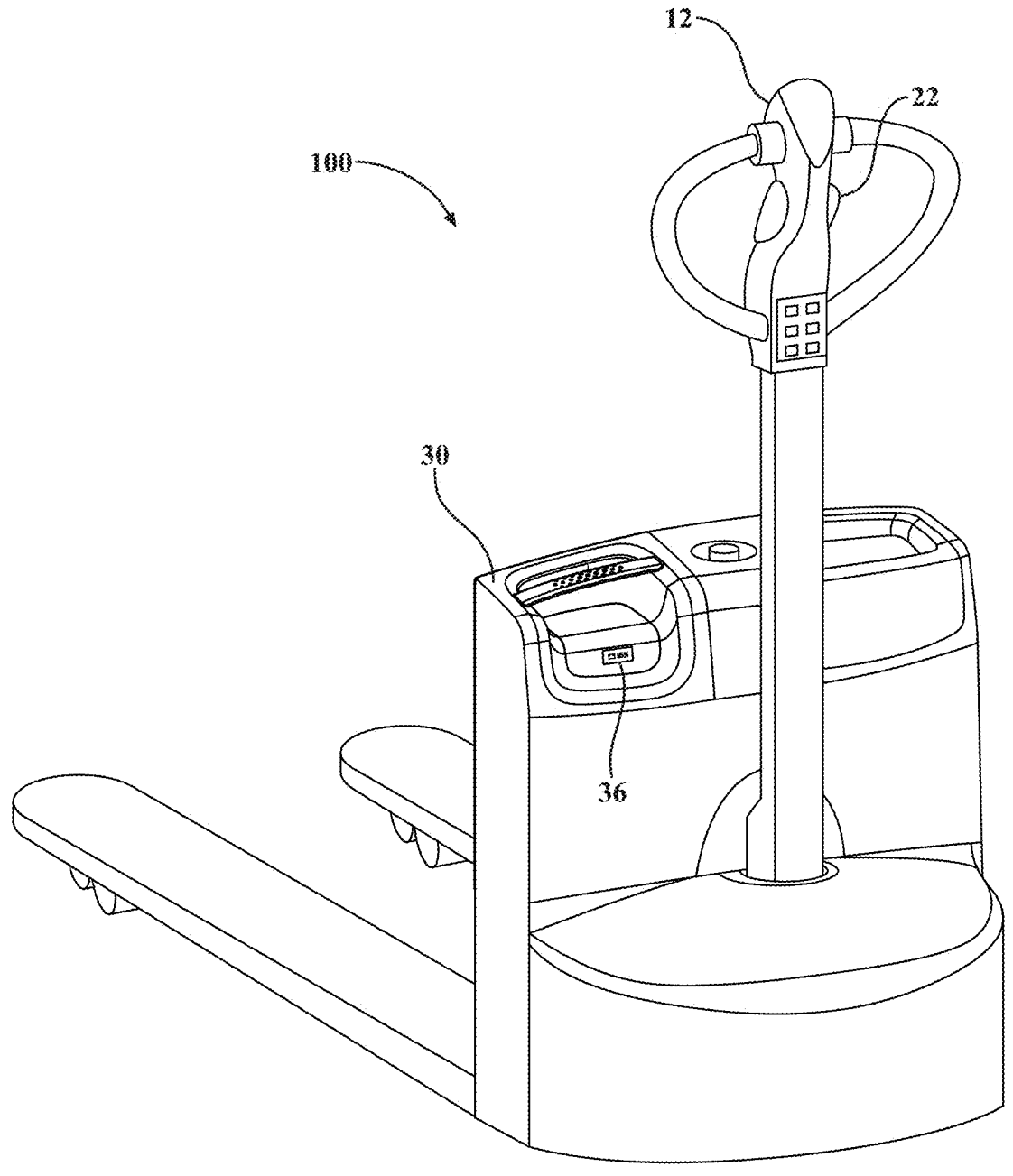
FIG. 1 is an illustration of a materials handling vehicle, i.e., a pallet truck, comprising vehicle control hardware and a battery assembly, which may be removable.
Figure 2:
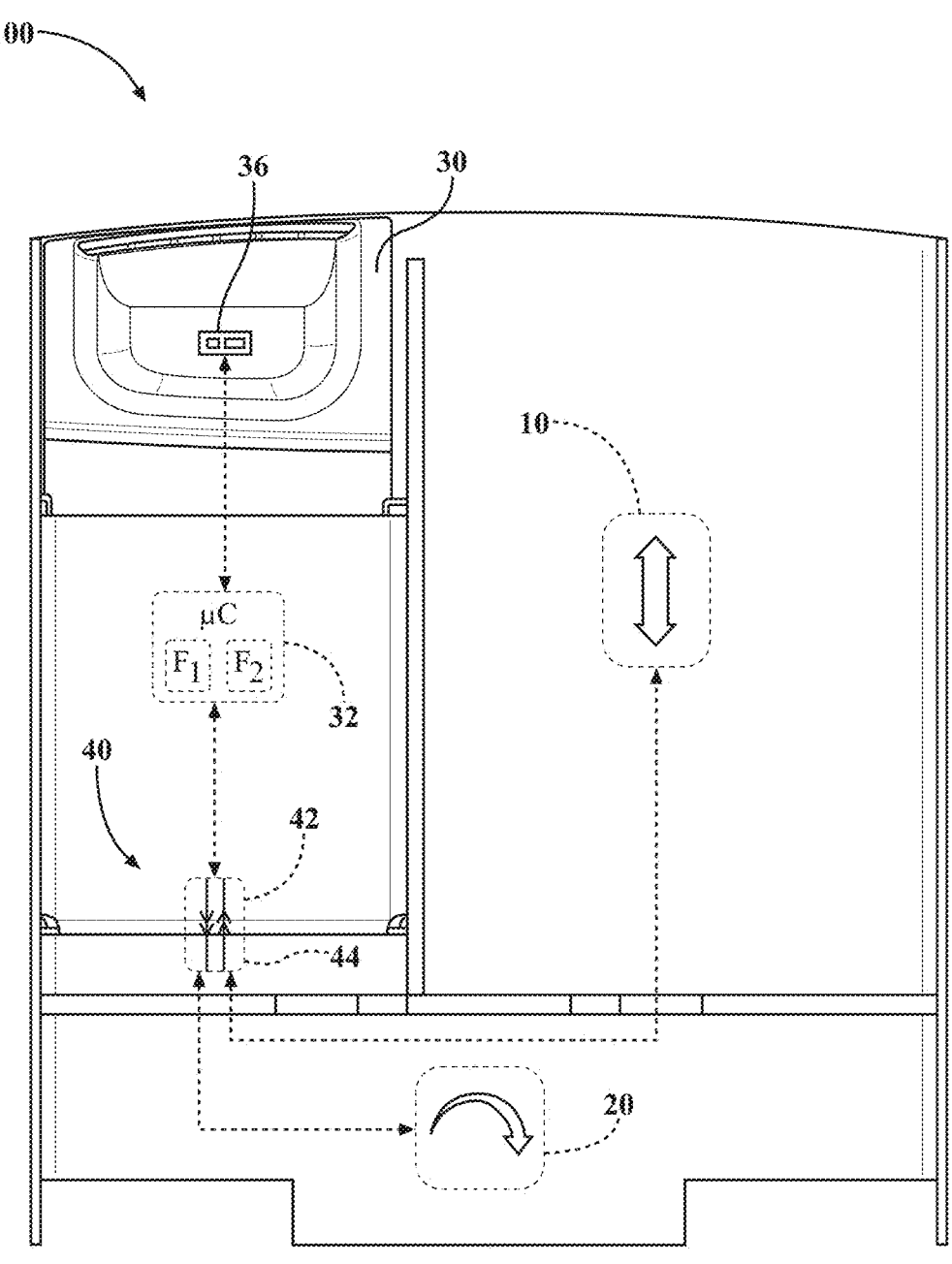
FIG. 2 is a schematic illustration of a materials handling vehicle comprising a battery assembly, a battery management system, a battery connector assembly, a materials handling subsystem, and a drive subsystem.

Referring initially to FIGS. 1 and 2, a materials handling vehicle 100 according to the present disclosure is illustrated comprising a materials handling subsystem 10, a drive subsystem 20, a removable battery assembly 30, and vehicle control hardware in the form of, for example, user-interfacing lift/lower controls 12, user-interfacing drive mode controls 22, and battery hardware in the form of, for example, battery insertion/removal hardware, diagnostic controls associated with the battery assembly 30, or visual displays 36 on the battery assembly 30. The removable battery assembly 30 may also comprise a releasable mating connector assembly 40 where a battery-side connector assembly 42 is engaged in a releasable manner with a vehicle-side connector assembly 44. The battery-side connector assembly 42 and the vehicle-side connector assembly 44 can be configured to electrically couple the removable battery assembly to the materials handling subsystem 10, the drive subsystem 20, and the vehicle control hardware of the materials handling vehicle 100.

The aforementioned user-interfacing lift/lower controls 12, and the necessary supporting electronics, may comprise any conventional, or yet-to-be developed, lift/lower controls such as toggle switches or levers on the handle of a pallet truck, lift/lower levers in the operator compartment of a fork lift, etc. These controls, and their supporting electronic components, may reside entirely at the materials handling vehicle, may communicate functionally with the materials handling vehicle without residing at the materials handling vehicle, or may comprise components that reside at the materials handling vehicle and components that merely communicate with the materials handling without residing at the vehicle, as would be the case for remote controls or server-based controls. State more concisely, the user-interfacing lift/lower controls 12 may reside entirely on the vehicle 100, may be remote from the vehicle 100, or may be a combination thereof.

Similarly, the aforementioned user-interfacing drive mode controls 22, and the necessary supporting electronics, may comprise any conventional, or yet-to-be developed, drive mode controls such as forward/reverse toggle switches or levers on the handle of a pallet truck, drive mode buttons and levers in the operator compartment of a fork lift, etc. As has been described above, with reference to the lift/lower controls 12 and supporting electronics, these drive mode controls 22, and their supporting electronic components, may reside entirely on the vehicle 100, may be remote from the vehicle 100, or may be a combination thereof.

As will be appreciated by those familiar with materials handling vehicles and, more particularly, battery-driven, or otherwise battery-powered, materials handling vehicles, the aforementioned vehicle control hardware can be either dedicated to the materials handling subsystem 10, the drive subsystem 20, or the removable battery assembly 30, or can be shared by a combination thereof.

The materials handling subsystem 10, the drive subsystem 20, and the vehicle control hardware are configured to cooperate, under power from the removable battery assembly 30, to execute a plurality of pick/place operations. As will be appreciated by those familiar with materials handling operations and materials handling vehicles, pick/place operations refer to the process of using the materials handling subsystem, drive subsystem, and vehicle control hardware of a materials handling vehicle, e.g., a forklift, pallet truck, etc., to move materials from one location to another. This can include picking up a load from a pallet or storage rack, transporting it to a new location, and placing it on another pallet or storage rack. More specifically typical pick and place operations may include:

Pre-operation checks: Before operating the lift truck, the operator may conduct a visual inspection to ensure that all safety guards and devices are in place and functioning properly. The operator may also check the battery charge and other truck parameters in accordance with the pre-operation checklist of the truck.

Positioning the lift truck: The operator positions the lift truck so that the forks, or other materials handling hardware, are aligned with the load and the load can be safely lifted and transported. This may require the operator to adjust the position of the lift truck using control hardware on the vehicle.

Lifting the load: The operator interfaces with control hardware on the vehicle to the lift the forks, or other materials handling hardware, to an appropriate height and to engage the load. The load should be securely engaged and the stability of the lift truck should be checked before moving it.

Transporting the load: The operator uses control hardware on the vehicle to move the vehicle and the load to the desired location.

Placing the load: The operator uses control hardware on the vehicle to lower the load and place it onto the desired pallet, storage rack, or other surface, checking for secure and stable engagement with the surface.

These pick/place operations can be characterized by a minimum duration $t_{P/P(min)}$. Individual pick/place operations will typically have a minimum duration $t_{P/P(min)}$ on the order of several seconds, with more complex pick/place operations being on the order of several minutes.

The removable battery assembly 30 may comprise a battery management system 32 that can be programmed to input or generate a state of charge signal representing a state of charge SOC of the battery assembly and implement first and second EWMA signal filters $F_1$, $F_2$ and a remaining runtime calculation R to permit the vehicle 100 to respond functionally to the runtime calculation R. The SOC signal may be input or generated by the battery management system in a variety of ways. For example, it may be calculated or estimated by the battery management system (BMS) or another component of the materials handling vehicle that is in communication with the BMS, determined from a model, or input from an external source, according the aforementioned conventional and yet-to-be developed teachings on SOC estimation. The present disclosure is not directed towards SOC estimation techniques, as existing and yet-to-be published literature provides ample teachings on the subject of SOC estimation. Rather, the present disclosure utilizes SOC as an input in an architecture that provides an indication of battery runtime in a battery-powered materials handling vehicle.

Figure 4:
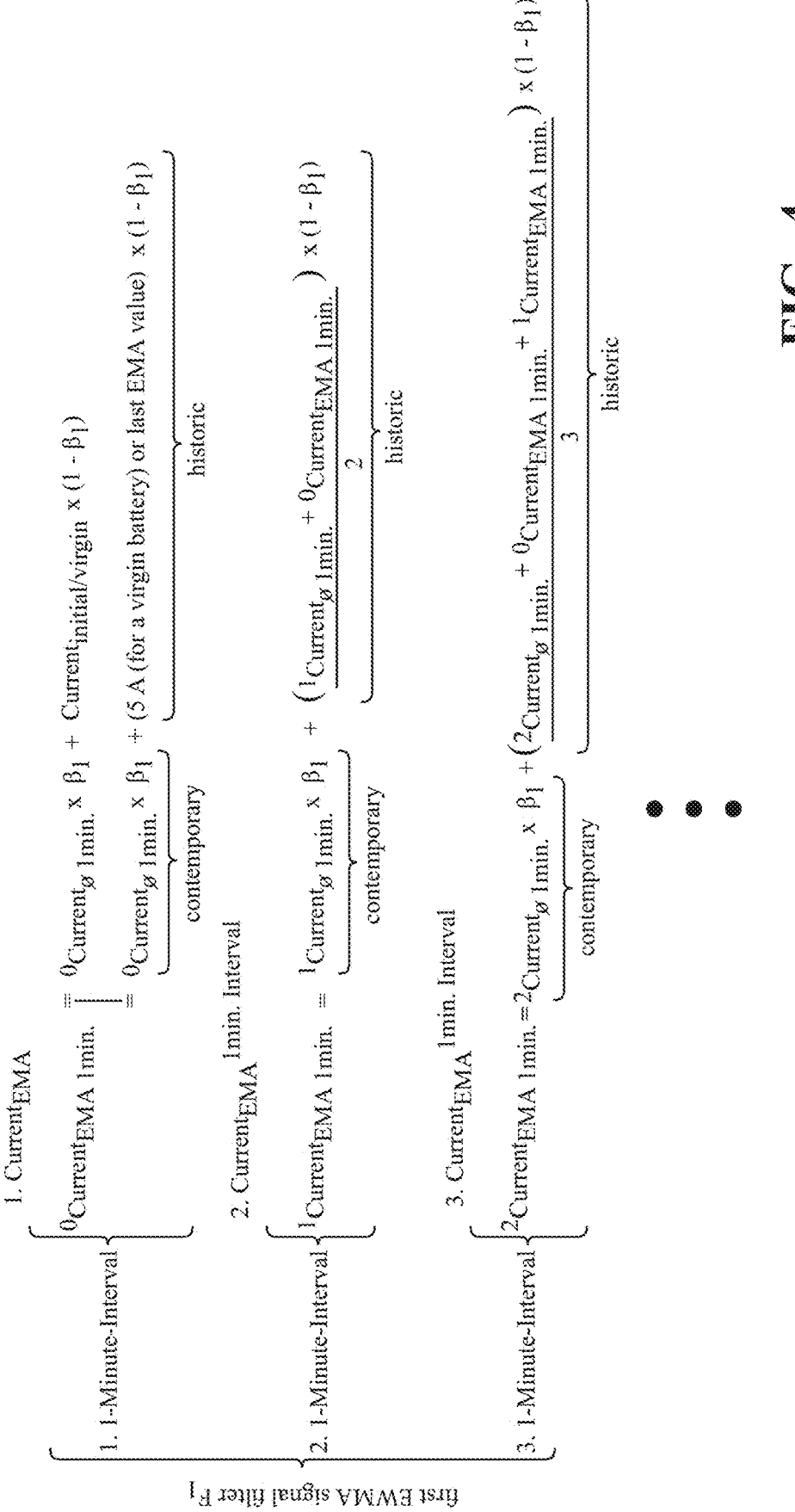
FIG. 4 illustrates an example of the implementation of a first EWMA signal filter $F_1$ according to the present disclosure.

More specifically, the first EWMA signal filter $F_1$ is implemented to calculate a succession ($^0I_C$, $^1I_C$, $^2I_C$, . . . ) of contemporary current calculations $I_C$ over a time envelope $t_E$. These contemporary current calculations advance by a time interval $t_1$ and comprise $$I_C = [(A \times \beta_1)] + [B \times (1 - \beta_1)]$$

where A comprises an average current load on the battery over the time interval $t_1$, B comprises a predetermined current load or a historic EWMA current calculation that precedes the average current load of A, temporally, $\beta_1$ comprises a first weighting parameter, and $t_1 > t_{P/P(min)}$. FIG. 4 illustrates an example implementation of a first EWMA signal filter $F_1$ where $t_1$ is one minute, A is the average current load on the battery over the directly preceding minute, and B is either the most recent EWMA current calculation for the battery or an amperage value that is representative of a typical average current draw of the vehicle battery, e.g., 5 Amps, if the battery is a "virgin" battery, i.e., if no previous EWMA current has been calculated for the battery.

When a battery-powered materials handling vehicle enters an atypical mode of operation, such as when entering the "creep" mode described below, care should be taken to ensure that the most recent EWMA current calculation for the battery, i.e., the "last EMA value," is taken before the vehicle enters the atypical mode of operation. By doing so, the integrity of the first EWMA signal filter $F_1$ and the ensuing runtime calculation R can be insulated from the current draw characteristics of the atypical mode of operation, which is important because atypical modes of operation, like the "creep" or "lift lockout" modes of operation described below, are not representative of a typical duty cycle of a materials handling vehicle.

Referring more particularly to the first EWMA signal filter $F_1$, it is noted that the average current load A of the first EWMA signal filter $F_1$ can be determined based on thousands of current value readings over the time interval $t_1$. For example, and not by way of limitation, the average current load A of the first EWMA signal filter $F_1$ can be determined by reading the current value every 50 msec over a period of 1 min, which would yield 1200 current readings per minute. Given the volatility associated with battery powered materials handling vehicles operating within, and outside of, a warehouse environment, it is contemplated that, in many instances it may be preferable to establish the time interval $t_1$ at a value between approximately 1 minute and approximately 10 minutes.

Figure 3:
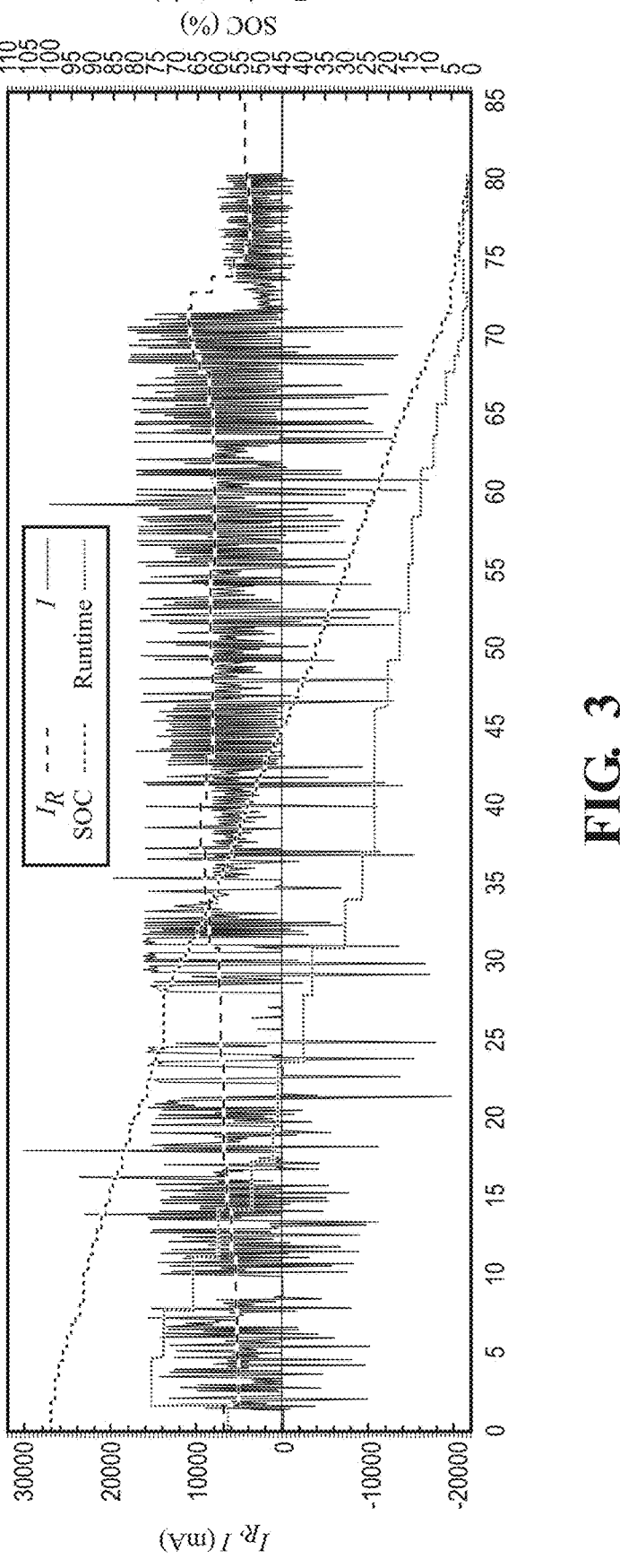
FIG. 3 is a plot illustrating the temporal progression of actual current load I, state of charge (SOC), calculated runtime current $I_R$, and Runtime R of a battery assembly of a materials handling vehicle, according to the present disclosure.

FIG. 3 is a plot illustrating the temporal progression of actual current load I, state of charge (SOC), calculated runtime current $I_R$, and Runtime R of a removable battery assembly of a materials handling vehicle executing a plurality of pick/place operations. As is illustrated in FIG. 3, the materials handling subsystem 10, the drive subsystem 20, and the vehicle control hardware are configured to cooperate to execute the plurality of pick/place operations such that the actual current load/on the battery assembly 30 cycles in a volatile manner between local maxima and a local minima a plurality of times over the aforementioned time interval $t_1$. Many of the local maxima and minima, over a given time interval $t_1$, of, e.g., approximately 1 minute, differ by at least approximately 1000 mA. Other local maxima and minima over a given time interval t/remain above 0 mA. Still other local maxima and minima over a given time interval $t_1$ extend above and below 0 mA, while still further local maxima and minima over a given time interval $t_1$ differ by at least approximately 1000 mA and up to approximately 5000 mA. Still further local maxima and minima over a given time interval $t_1$ differ by as much as 30-50 A, while still other materials handling vehicles may generate power swings on the order of hundreds of Amps.

As is illustrated in FIG. 4, the battery management system 32 can be programmed to implement the first EWMA signal filter $F_1$ with B comprising the historic EWMA current calculation, when one is available. The historic EWMA current calculation can be introduced as an average of the average current load A and one or more previously calculated EWMAs of battery assembly current load. In some instances, when implementing the first EWMA signal filter $F_1$ the historic EWMA current calculation will not available. To account for this, the battery management system 32 can be programmed to implement the first EWMA signal filter $F_1$ with B instead comprising a predetermined current load, as follows:

$$1.0 \quad Amp \le B \le (0.5)I_{MAX}$$

where $I_{MAX}$ comprises a maximum current load (Amperes) on the battery assembly 30 with the materials handling subsystem 10, the drive subsystem 20, and the aforementioned vehicle control hardware configured to cooperate to execute a plurality of pick/place operations, noting that the value of $I_{MAX}$ depends on the particular materials handling vehicle in use and may, for example, be approximately 30 Amps for many vehicles.

The second EWMA signal filter $F_2$ is implemented to calculate the runtime current $I_R$, which can be used to generate a runtime calculation R according to:

$$R = SOC/I_R$$

where the SOC of the cells of a battery in a battery-powered materials handling vehicle can be defined as the available capacity of the battery, often measured in Ampere hours (Ah), and can be expressed as a percentage of its rated capacity. Additional details on SOC determination are presented below.

Figure 5:
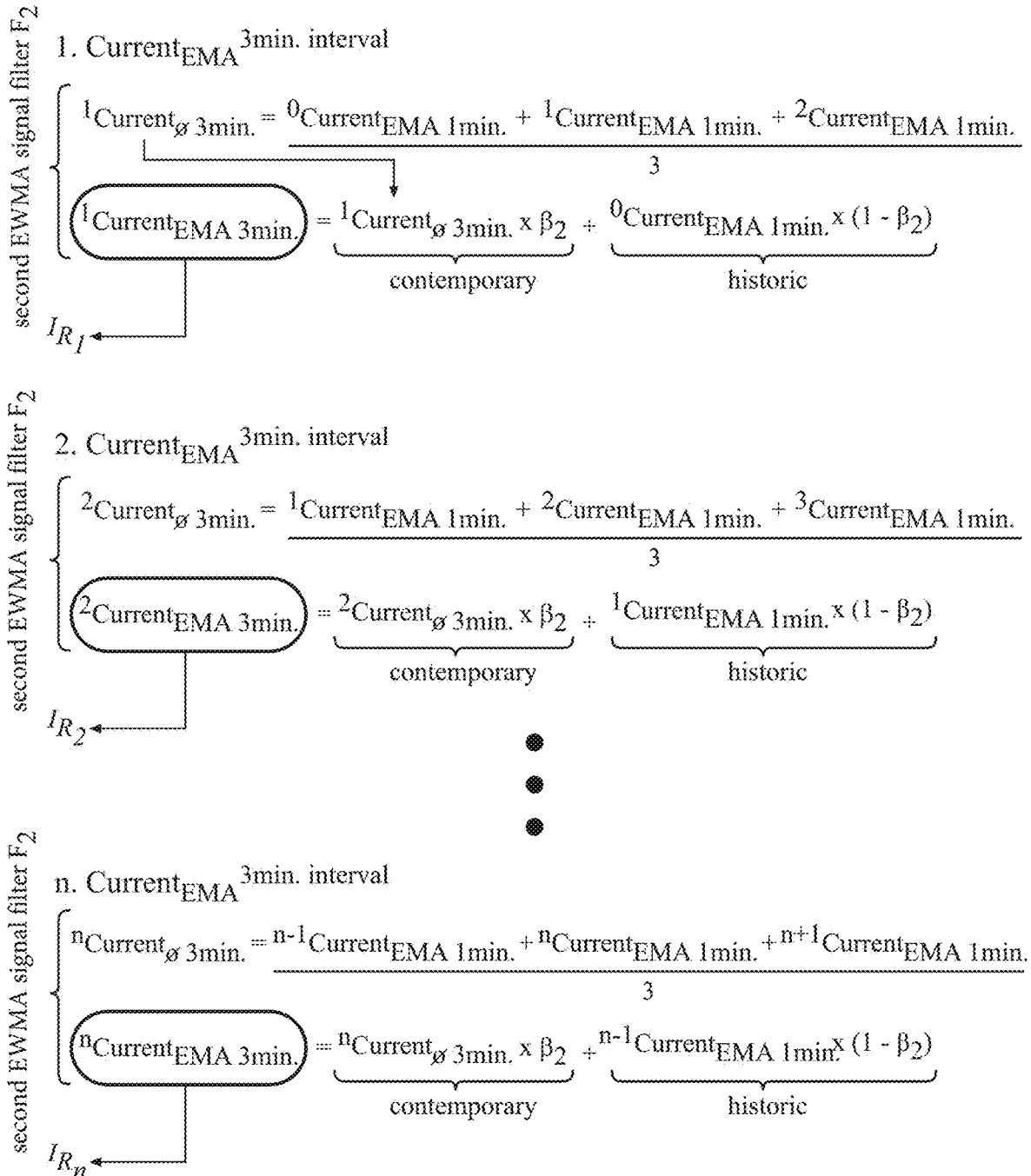

As is illustrated in FIG. 5, the runtime current calculation that is facilitated by the second EWMA signal filter $F_2$ comprises $$I_R = [(C \times \beta_2)] + [D \times (1 - \beta_2)]$$

where C comprises an average, over a time envelope $t_E$, of a plurality of the succession $({}^0I_C, {}^1I_C, {}^2I_C, \ldots)$ of contemporary current calculations $I_C$ from the first EWMA signal filter $F_1$, D comprises a historic EWMA current calculation that precedes temporally at least one of the plurality of the succession $({}^0I_C, {}^1I_C, {}^2I_C, \ldots)$ of contemporary current calculations $I_C$ from the first EWMA signal filter $F_1$, $\beta_2$ comprises a second weighting parameter, where $\beta_2$ is often less than $\beta_1$, and the time intervals ty forming the time envelope $t_E$ over which the contemporary current calculations $I_C$ are taken is greater than the minimum duration $t_{P/P(min)}$ of the pick/place operations executed by the materials handling vehicle.

FIG. 5 illustrates an example implementation of a second EWMA signal filter $F_2$ where the time envelope $t_E$ is three minutes, C is the average of the three preceding contemporary current calculations $I_C$, taken over the preceding three minute envelope, from the first EWMA signal filter $F_1$, and D is a historic EWMA current calculation that precedes the latter two of the three preceding contemporary current calculations $I_C$.

As is illustrated in FIG. 5, the battery management system 32 can be programmed to calculate successive runtime currents $IR_1, IR_2, \ldots IR_n$, etc., by temporally advancing sampling periods associated with the average C and the historic EWMA current calculation D of the second EWMA signal filter $F_2$. The sampling periods associated with the average C and the historic EWMA current calculation D of the second EWMA signal filter $F_2$ can both be advanced by the time interval $t_1$ to calculate the successive runtime currents $IR_1, IR_2, \ldots IR_n$, etc.

As is illustrated in FIGS. 4 and 5, the first and second EWMA signal filters $F_1$ and $F_2$ utilize the weighting parameters $\beta_1$ and $\beta_2$ with $\beta_1$ of the first EWMA signal filter $F_1$ being greater than $\beta_2$ of the second EWMA signal filter $F_2$. More specifically, it is contemplated that runtime calculations in many materials handling applications will be particularly informative and functional if $$1.5 \quad \beta_2 < \beta_1.$$

For example, referring to FIG. 3, the current load, over time t (min), on a battery-driven, or otherwise battery-powered, materials handling vehicle in a particular material handling environment will include portions where:

the vehicle is not moving or carrying a load, and the current load on the battery is close to zero (see, e.g., t<2 min);

the vehicle executes various pick/place operations, with various material loads, while also traveling up and down a ramp (see, e.g., 2 min</<25 min) or traveling on level ground (see, e.g., 28 min<t<72 min);

the vehicle executes only lifting/lowering operations, without traveling (see, e.g., 25 min</<28 min); and the vehicle is driving in creep speed mode, e.g., 1.5 km/hr, as may be the case when the remaining runtime calculation R returns a value less than 5-10 minutes (see, e.g., 72 min<t<80 min).

In the context of the above examples, and not by way of limitation, the aforementioned volatility of the current load can be addressed in runtime calculations by establishing $\beta_1$ and $\beta_2$ between 0 and 1. Or, more particularly, in embodiments, the aforementioned volatility can be addressed by setting $\beta_1$ to be approximately 0.9 and $\beta_2$ to be approximately 0.5.

Figure 6:
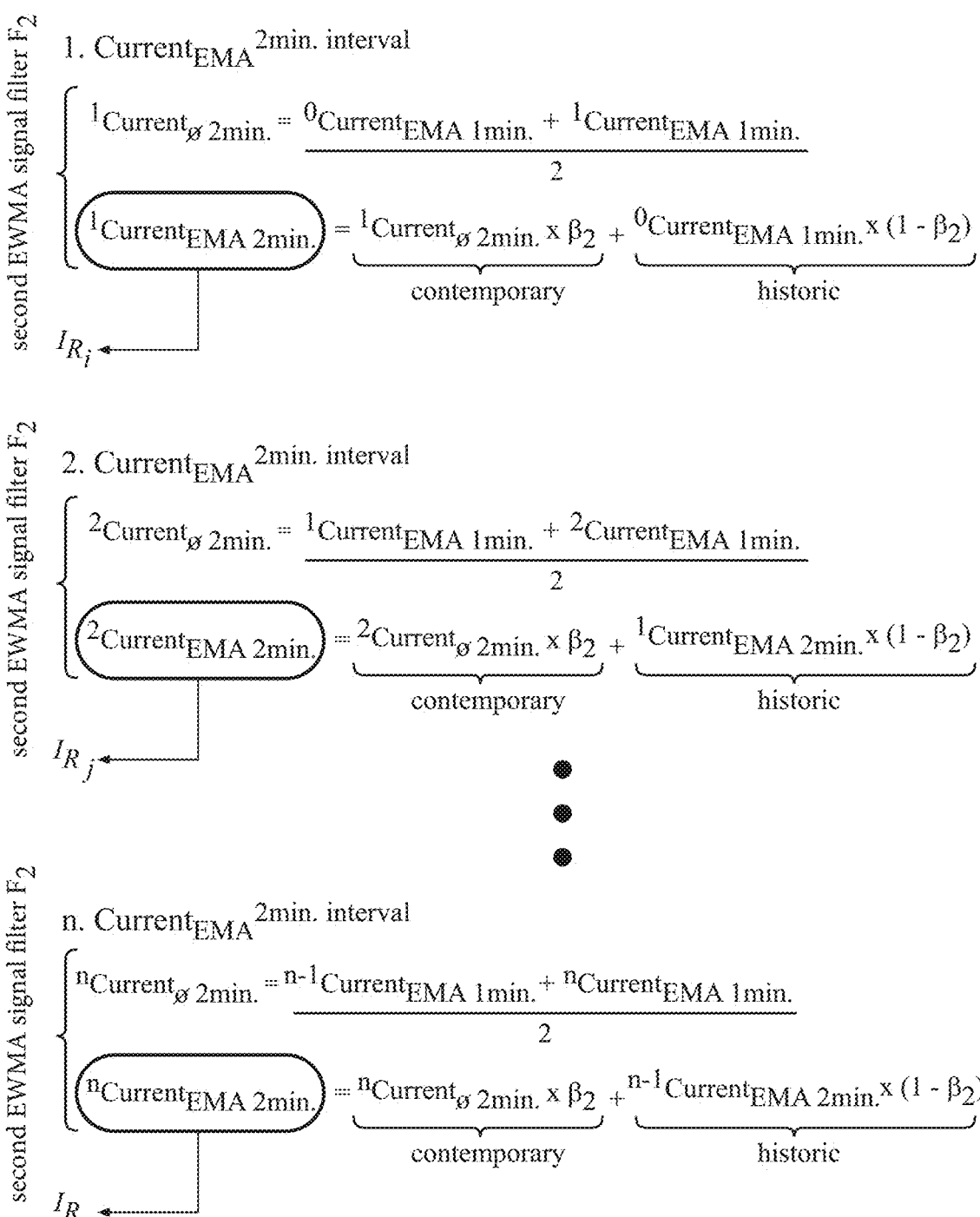

FIGS. 6 and 7 illustrate implementation of the second EWMA signal filter $F_2$, with progressively shorter time envelopes $t_E$. More specifically, the functionality of the runtime calculation R can be enhanced by programming the battery management system 32 to reduce the time envelope $t_E$ of the second EWMA signal filter $F_2$ as a function of the SOC of the battery assembly 30. In embodiments, the time envelope $t_E$ of the second EWMA signal filter $F_2$ can be reduced a first time when the SOC of the battery assembly falls below a first SOC threshold, and a second time when the SOC of the battery assembly falls below a second SOC threshold that is lower than the first SOC threshold. Although the aforementioned reductions in the time envelope $t_E$ of the second EWMA signal filter $F_2$, may result in more volatile runtime calculations, the calculations may be more precise. This volatility/precision trade-off can be particularly advantageous as the SOC of the battery assembly drops to lower levels. Additionally, the use of multiple SOC thresholds facilitates a degree of flexibility in the volatility/precision trade-off, since the use of multiple thresholds allows for more emphasis on shorter term trends in the current profile. In this sense, the algorithm is a fast algorithm that can keep up with rapidly changing battery current profiles to enable SOC derivations and runtime calculations that are more accurate that conventional runtime calculation methods.

In the examples of FIGS. 6 and 7, the time interval $t_1$ is set to, for example, 1 minute, and the time envelope $t_E$ of the second EWMA signal filter $F_2$ is a multiple of the time interval $t_1$ and regresses from a first multiple, e.g., 3 minutes, when the SOC of the battery assembly is above a first SOC threshold, to a lower second multiple, e.g., 2 minutes, when the SOC of the battery assembly falls below the first SOC threshold, and subsequently to a third lower multiple, e.g., 1 minute, when the SOC of the battery assembly falls below a second SOC threshold. It is contemplated that the first SOC threshold can be set between approximately 10% and approximately 30% and the second SOC threshold can be set between approximately 5% and approximately 20%. For example, and not by way of limitation, the first SOC threshold may be approximately 20% and the second SOC threshold may be approximately 10%. By setting the time envelope $t_E$ of the second EWMA signal filter $F_2$ to be a multiple of the time interval $t_1$, the time interval $t_1$ can be temporally aligned with the various components of the second EWMA signal filter $F_2$, which allows for a more precise runtime calculation.

The vehicle control hardware can be programmed to respond functionally to the runtime calculation R to create a technical operational effect in the materials handling vehicle. More specifically, to further illustrate the subject matter of the present disclosure, without limitation, when the runtime calculation reaches various descending values from the initially calculated runtime, these values can be used to control hardware on the battery, such as battery insertion/ removal hardware, diagnostic controls, or the battery display.

For example, and not by way of limitation, the user-interfacing lift/lower controls 12 and supporting electronics of the materials handling vehicle 100 can be configured to automatically enter a "lift lockout" mode where the lift/ lower functionality of the materials handling vehicle 100 is cut off, progressively limited, or otherwise disabled, as a function of the runtime calculation R, or when the runtime calculation R falls below a predetermined threshold. For example, to further illustrate the subject matter of the present disclosure, without limitation, when the runtime calculation falls below 5-10 minutes, the materials handling mechanism may be set to a safe traveling height, with all other lift/lower functionality disabled, so that the vehicle may be driven, in a manual or automated manner, directly to a battery recharging or battery exchange station. Or, at runtimes below 5-10 minutes, with the materials handling mechanism in an appropriate state, the lift/lower buttons on the tiller handle of a pallet truck may be disabled.

As a further example, the user-interfacing drive mode controls 22 and supporting electronics may be configured to automatically cut off, progressively limit, or otherwise disable, specific drive modes of the materials handling vehicle, as a function of the runtime calculation R, or when the runtime calculation R falls below a predetermined threshold. For example, to further illustrate the subject matter of the present disclosure, without limitation, when the runtime calculation falls below 5-10 minutes, the drive subsystem may be set to a relatively slow maximum travelling speed, i.e., a "creep mode," to alert the operator that available runtime is diminishing.

As an additional example, the battery hardware and supporting electronics, which may at least partially be embodied or otherwise functionalized by the BMS 32, may be configured to automatically change, enable, or disable, as a function of the runtime calculation R, or when the runtime calculation R falls below a predetermined threshold. More specifically, the battery hardware may comprise a visual runtime display 36 on the battery assembly 30, or elsewhere on the vehicle, that is configured to progressively change as a function of the runtime calculation R, e.g., by showing the remaining runtime minutes on the display. In embodiments, it is contemplated that the calculated runtime may be transmitted to a display on the battery, or elsewhere on the vehicle, at specific time intervals, to provide a convenient indication of battery runtime.

Although a variety of conventional or yet-to-be developed battery assemblies are contemplated by the present disclosure, the concepts herein are deemed to be particularly useful in the context of battery assemblies 30 that comprise lithium-ion cells and, more particularly, lithium-ion cells characterized by a maximum battery capacity of between approximately 5 AH and approximately 1000 AH, or more, and weights of between approximately 5 kg and approximately 500 kg, or more. In the context of the present disclosure, it is noted that battery assemblies comprising a lithium-ion cell use the reversible reduction of lithium ions to store energy.

It is contemplated that the aforementioned vehicle control hardware, e.g., user interfaces, controllers, drive motors, hydraulic or pneumatic lift/lower hardware, electronic/electrical hardware, display hardware, and other types of control hardware, encompass any of the variety of conventional or yet-to-be developed control hardware that would be incorporated in a battery-driven, or otherwise battery-powered, materials handling vehicle to facilitate operation of the vehicle in its intended manner. For example, and not by way of limitation, battery-powered materials handling vehicles according to the present disclosure would typically comprise one or more, shared or dedicated, battery-side or vehicle-side, programmable controllers for executing battery-powered driving, braking, steering, and/or lift/lower functions of the vehicle. Contemplated vehicles may also incorporate battery-side or vehicle-side user interfacing control hardware to facilitate operation of the vehicle. This user interfacing control hardware may comprise battery-side or vehicle-side control buttons, switches, user interfaces, displays, lights, audio devices, etc.

As is noted above, the present disclosure is not directed towards SOC estimation techniques. However, because the various contemplated runtime calculations R of the present disclosure rely on the input or generation of a state of charge signal, for completeness, it is noted that there are several methods for measuring the SOC of a battery, including:

Coulomb counting: This method involves measuring the amount of charge that has been added to or removed from the battery over time. The SOC is then calculated based on the total charge added or removed relative to the battery's capacity.

Voltage measurement: The voltage of a battery is directly related to its SOC. As the battery discharges, the voltage decreases, and as the battery charges, the voltage increases. By measuring the open circuit voltage (OCV) of the battery, it is possible to estimate the SOC.

Internal resistance measurement: The internal resistance of a battery is related to its SOC. As the battery discharges, the internal resistance increases, and as the battery charges, the internal resistance decreases. By measuring the internal resistance of the battery, it is possible to estimate the SOC.

Neural network-based methods: In recent years, neural network-based methods have been developed for estimating the SOC of a battery. These methods use machine learning algorithms to learn the relationship between the battery's SOC and various input parameters, such as current, voltage, and temperature.

The accuracy of these methods can vary, and the choice of method will depend on a variety of factors based on subjective system design preferences. Generally, it is preferable to use the OCV of the battery to determine SOC when the battery is not under load and a sufficient amount of time has elapsed to permit the battery chemistry to stabilize. Coulomb counting is often the preferred method when the battery is under load. The OCV of a battery can also be used to correct SOC determinations based on Coulomb counting methodology.

The state of health (SOH) of a battery refers to its overall condition and ability to perform its intended function. It is typically characterized by factors such as capacity, efficiency, and lifespan. The SOH of a battery could affect the accuracy of state of charge (SOC) measurements in a number of ways. For example:

Capacity loss: As a battery ages, its capacity (i.e., the amount of electrical energy it can store) may decrease. This can cause the battery to discharge more quickly than expected, leading to an overestimation of its SOC.

Self-discharge: All batteries have some degree of self-discharge, which is the loss of electrical energy due to internal chemical reactions. The rate of self-discharge increases as a battery ages, which can lead to an underestimation of its SOC.

Accordingly, the present disclosure contemplates advantages in considering the SOH of a battery to ensure accurate SOC measurements.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present invention it is noted that the term "approximately" is utilized herein to represent the inherent degree of uncertainty that may be attributed to any quantitative comparison, value, measurement, or other representation, and/or to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A removable battery assembly comprising a battery cell storing electrical energy, a visual display on the battery assembly, and a battery management system that is programmed to:

input or generate a state of charge signal representing a state of charge (SOC) of the battery assembly;

implement a first Exponentially Weighted Moving Average (EWMA) signal filter $F_1$ to calculate a succession ($^0I_C$, $^1I_C$, $^2I_C$, ...) of contemporary current calculations $I_C$ wherein the contemporary current calculations advance by a time interval $t_1$ and comprise $$I_C = [(A \times \beta_1)] + [B \times (1 - \beta_1)]$$

and wherein A comprises an average current load on the battery over the time interval $t_1$, B comprises a predetermined current load or a historic EWMA current calculation that precedes the average current load of A, temporally, and $\beta_1$ comprises a first weighting parameter;

implement a second EWMA signal filter $F_2$ to calculate a runtime current $I_R$, wherein the runtime current calculation comprises $$I_R = [(C \times \beta_2)] + [D \times (1 - \beta_2)]$$

and where C comprises an average, over a time envelope $t_E$, of a plurality of the succession ($^0I_C$, $^1I_C$, $^2I_C$, ...) of contemporary current calculations $I_C$ from the first EWMA signal filter $F_1$, D comprises a historic EWMA current calculation that precedes temporally at least one of the plurality of the succession ($^0I_C$, $^1I_C$, $^2I_C$, ...) of contemporary current calculations $I_C$ from the first EWMA signal filter $F_1$, and $\beta_2$ comprises a second weighting parameter; and implement a remaining runtime calculation R comprising $$R = SOC/I_R$$

wherein the visual display on the battery assembly is configured to automatically change as a function of the runtime calculation R.

2. The removable battery assembly of claim 1 wherein the visual display on the battery comprises a visual runtime display that is configured to progressively change as a function of the runtime calculation R.

3. The removable battery assembly of claim 1 wherein the battery management system is programmed to reduce the time envelope tr of the second EWMA signal filter $F_2$ when the SOC of the battery assembly falls below a first SOC threshold.

4. The removable battery assembly of claim 3 wherein the battery management system is programmed to further reduce the time envelope tr of the second EWMA signal filter $F_2$ when the SOC of the battery assembly falls below a second SOC threshold that is lower than the first SOC threshold.

5. The removable battery assembly of claim 4 wherein the first SOC threshold is between approximately 10% and approximately 30% and the second SOC threshold is between approximately 5% and approximately 20%.

6. The removable battery assembly of claim 1 wherein:

$$\beta_2 < \beta_1.$$

7. The removable battery assembly of claim 1 wherein:

$$1.5 \, \beta_2 < \beta_1.$$

8. The removable battery assembly of claim 1 wherein the battery management system is programmed to implement the first EWMA signal filter $F_1$ with B comprising a historic EWMA current calculation that is an average of the average current load A and one or more previously calculated EWMAs of battery assembly current load.

9. The removable battery assembly of claim 1 wherein the battery management system is programmed to calculate successive runtime currents $IR_1$, $IR_2$, $IR_3$, etc., by temporally advancing sampling periods associated with the average C and the historic EWMA current calculation D of the second EWMA signal filter $F_2$.

10. The removable battery assembly of claim 9 wherein the sampling periods associated with the average C and the historic EWMA current calculation D of the second EWMA signal filter $F_2$ are both advanced by the time interval $t_1$ to calculate the successive runtime currents $IR_1$, $IR_2$, $IR_3$, etc.

11. The removable battery assembly of claim 1 wherein:
the battery management system is programmed to implement the first EWMA signal filter $F_1$ with B comprising a historic EWMA current calculation that is an average of the average current load A and one or more previously calculated EWMAs of battery assembly current load;
the battery management system is programmed to calculate successive runtime currents $IR_1$, $IR_2$, $IR_3$, etc., by temporally advancing sampling periods associated with the average C and the historic EWMA current calculation D of the second EWMA signal filter $F_2$; and
the sampling periods associated with the average C and the historic EWMA current calculation D of the second EWMA signal filter $F_2$ are both advanced by the time interval $t_1$ to calculate the successive runtime currents $IR_1$, $IR_2$, $IR_3$, etc.

12. A removable battery assembly comprising a battery cell storing electrical energy, a visual display on the battery assembly, and a battery management system that is programmed to:
input or generate a state of charge signal representing a state of charge (SOC) of the battery assembly,
implement a first Exponentially Weighted Moving Average (EWMA) signal filter $F_1$ to calculate a succession $(^{0}I_C, {}^{1}I_C, {}^{2}I_C, \ldots)$ of contemporary current calculations $I_C$,
implement a second EWMA signal filter $F_2$ to calculate a runtime current $I_R$, wherein the runtime current calculation $I_R$ comprises the contemporary current calculations $I_C$ from the first EWMA signal filter $F_1$, and
implement a remaining runtime calculation R comprising $$R = SOC/I_R$$

wherein the visual display on the battery assembly is configured to automatically change as a function of the runtime calculation R.

13. The removable battery assembly of claim 12 wherein the visual display on the battery comprises a visual runtime display that is configured to progressively change as a function of the runtime calculation R.

* * * * *